United States Patent Office 3,108,988
Patented Oct. 29, 1963

3,108,988
THERMOPLASTIC COMPOSITIONS COMPRISING VINYL CHLORIDE POLYMER, STYRENE COPOLYMER, AND ACRYLONITRILE-1,3 BUTADIENE COPOLYMER

Alceste Burri, Terni, Italy, assignor to Montecatini Societa Generale per l'Industria Mineraria e Chimica, Milan, Italy, a corporation of Italy
No Drawing. Filed May 18, 1960, Ser. No. 29,791
Claims priority, application Italy June 30, 1959
8 Claims. (Cl. 260—45.5)

This invention particularly relates to vinyl halide thermoplastic polymeric compositions having markedly improved physical properties, especially in respect to impact strength. It especially relates to thermoplastic compositions comprising polyvinyl chloride suitable for manufacture of devices which must withstand shock and vibration, such as tubes, gutters, plates, pipe fittings, cocks and fittings, and troughs. The compositions are mainly homogeneous mixtures of the following components:

(a) At least 80% (viz. 80–90% by weight) of vinyl chloride polymers, or copolymers, having a high molecular weight, the copolymers having a high vinyl chloride content.

(b) Up to 10%, preferably 5 to 10%, by weight of copolymers of styrene, and or its derivatives such as methylstyrene, halogenated styrenes, etc., with acrylonitrile, the acrylonitrile of the said copolymers constituting 50 to 25% thereof, the styrene or styrene derivative constituting 50 to 75% thereof.

(c) Amounts up to 10%, preferably 5 to 10% by weight, of copolymers of 1,3 butadiene with acrylonitrile, the butadiene constituting 50 to 90% of the copolymer, the acrylonitrile constituting 50 to 10% of the copolymer. In a much preferred embodiment the said butadiene-acrylonitrile copolymers constitute at least two copolymers one of which is richer in butadiene than the other. That is, one of said two copolymers preferably constitutes 75 to 50% of butadiene, the other constituting 75 to 90% of butadiene, the two copolymers being utilized preferably in the mutual weight ratio of one of the first to two of the second.

In respect to known methods, the process offers the great advantage of employing copolymers comprised of two components. This leads to simpler and easier preparation of a reproducible copolymer than a three-component copolymer.

The mixing operation can be carried out according to any technique generally used for mixing polymers. This applies to polymers obtained from latex coagulates, or from powders, or from mixtures obtained directly through polymerization.

The following examples illustrate preferred embodiments of the invention, but are not intended to limit the scope thereof.

Example No. 1

Into a roll-mixer are introduced 830 g. of polyvinyl chloride of high molecular weight, obtained by suspension polymerization of polyvinyl chloride, 80 g. of styrene-acrylonitrile copolymer, styrene-acrylonitrile ratio 75–25, 60 g. of acrylonitrile-butadiene copolymer, ratio 18–82, 30 g. of acrylonitrile-butadiene copolymer, ratio 33–67. 30 g. of basic lead stearate are also added as a stabilizer. Mixing is carried on for 5 minutes at 160° C. and the sheet obtained is then granulated.

Characteristics of new anti-impact composition:
- Tensile strength_____ 412 kg./cm.$^2$.
- Bending (transverse) strength___ 2140 kg./cm.$^2$.
- Stretching power (elongation)___ 46%.
- Impact strength_____ 6 kg. cm./mm. of notch.

A granulated product obtained only from polyvinyl chloride mixed for 5 minutes at 160° C., presents instead the following characteristics.

Characteristics of PVC (polyvinyl chloride):
- Tensile strength_____ 498 kg./cm.$^2$.
- Bending strength_____ 2950 kg./cm.$^2$.
- Stretching power (elongation)_ 20%.
- Impact strength_____ 1.4 kg. cm./mm. of notch.

Characteristics of Geon 404 HI defined in U.S. Patent No. 2,808,387, column 5:
- Tensile strength_____ 427 kg./cm.$^2$.
- Bending strength_____ 2170 kg./cm.$^2$.
- Stretching power_____ 42%.
- Impact strength_____ 4 kg. cm./mm. of notch.

The impact values were determined experimentally on prismatic samples, 12 x 4 x 30 mm., having at half height a notch, size 1 mm., by the falling ball method.

Example No. 2

Into a roll-mixer are introduced 830 g. of polyvinyl chloride of high molecular weight, obtained by suspension polymerization of vinyl chloride, 85 g. of alpha-methylstyrene-acrylonitrile copolymer, ratio 75–25, 55 g. of acrylonitrile-butadiene copolymer, ratio 18–82, 30 g. of acrylonitrile-butadiene copolymer, ratio 33–67. 30 g. of basic lead stearate are also added as a stabilizer. Mixing is carried on for 15 minutes at 160° C. and the sheet obtained is then granulated.

Characteristics of the product:
- Tensile strength_____ 418 kg./cm.$^2$.
- Bending strength_____ 2135 kg./cm.$^2$.
- Stretching power_____ 47%.
- Impact strength_____ 5.5 kg. cm./mm. of notch.

Example No. 3

Into a roll-mixer are introduced 840 g. of polyvinyl chloride at high molecular weight, obtained by suspension polymerization of vinyl chloride, 80 g. of styrene-acrylonitrile copolymer, ratio 75–25, 80 g. of acrylonitrile-butadiene copolymer, ratio 18–82. 30 g. of basic lead stearate are also added as a stabilizer. Mixing is carried on for 5 minutes at 160° C. and the sheet obtained is then granulated.

Characteristics of the product:
- Tensile strength_____ 407 kg./cm.$^2$.
- Bending strength_____ 2145 kg./cm.$^2$.
- Stretching power_____ 45%.
- Impact strength_____ 6.5 kg. cm./mm. of notch.

Example No. 4

Into a roll-mixer are introduced:

830 g. of polyvinyl chloride at high molecular weight, obtained by suspension polymerization of vinyl chloride.
80 g. of styrene-acrylonitrile copolymer, ratio 75-25.
60 g. of acrylonitrile-butadiene copolymer, ratio 18-82.
30 g. of acrylonitrile-butadiene copolymer, ratio 33-67.
30 g. of basic lead stearate, as a stabilizer.
80 g. of titanium dioxide, as a pigment.

Mixing is carried on for 5 minutes at 160° C. and the sheet obtained is then granulated.

Characteristics of the product:
  Tensile strength_____ 415 kg./cm.²
  Bending strength_____ 2128 kg./cm.²
  Stretching power_____ 44%.
  Impact strength_____ 6.3 kg. cm./mm. of notch.

Example No. 5

A number of high-impact compositions were prepared, employing copolymers of 98% vinyl chloride copolymers with 2% of one of the following: acrylonitrile, methylmethacrylate, vinyl acetate, vinylidene chloride, and methyl acrylate. These copolymers are mixed with the same ingredients, and in the same proportions, as described in Example No. 3. The mixing is carried on for 5 minutes at 160° C. and the material is formed into sheets or tapes, which then are granulated.

Characteristics of the granulated material:
  A. Copolymer with acrylonitrile—
    Tensile strength____ 402 kg./cm.².
    Bending strength____ 2070 kg./cm.².
    Stretching power
      (elongation)_____ 48%.
    Impact strength____ 6.1 kg. cm./mm. of notch.
  B. Copolymer with methylmethacrylate—
    Tensile strength____ 406 kg./cm.².
    Bending strength____ 2083 kg./cm.².
    Stretching power___ 45%.
    Impact strength____ 5.8 kg. cm./mm. of notch.
  C. Copolymer with vinyl acetate—
    Tensile strength____ 415 kg./cm.².
    Bending strength____ 2127 kg./cm.².
    Stretching power___ 43%.
    Impact strength____ 6.0 kg. cm./mm. of notch.
  D. Copolymer with vinylidene chloride—
    Tensile strength____ 403 kg./cm.².
    Bending strength____ 2068 kg./cm.².
    Stretching power___ 41%.
    Impact strength____ 5.9 kg. cm./mm. of notch.
  E. Copolymer with methyl acrylate—
    Tensile strength____ 418 kg./cm.².
    Bending strength___ 2143 kg./cm.².
    Stretching power___ 47%.
    Impact strength____ 6.2 kg. cm./mm. of notch.

Example No. 6

Into a reactor provided with mechanical stirring, are introduced:

2075 g. of a 40% polyvinyl chloride latex, obtained by emulsion polymerization of vinyl chloride.
266 g. of a 30% styrene-acrylonitrile copolymer latex, ratio 75-25.
133 g. of a 45% butadiene-acrylonitrile copolymer latex, ratio 82-18.
66 g. of a 45% butadiene-acrylonitrile copolymer latex, ratio 67-33.

These are mixed for 30 minutes at room temperature and then either coagulated by adding a saturated solution of aluminum sulfate, or dried in a Nubilosa type drier. 30 g. of basic lead stearate are then added to the powder obtained which is treated in a roll-mixer for 5 minutes at 160° C. and finally granulated.

Characteristics of the product:
  Tensile strength_____ 401 kg./cm.².
  Bending strength_____ 2003 kg./cm.².
  Stretching power_____ 49%.
  Impact strength_____ 6.2 kg. cm./mm. of notch.

The invention, in its preferred embodiment, or embodiments, is further summarized as follows:

Certain compositions containing polymers and copolymers of vinyl chloride have been prepared and have been found to possess satisfactory transverse and tensile strength together with surprisingly high impact strength.

Such compositions are obtained according to the invention:

(1) By mechanical hot mixing, at about 160° C., with common roller mixers;
(2) By mixing the components in the form of latexes, and subsequently drying;
(3) By means of graft copolymerization of the other components B and C (defined below) of the compositions on polyvinyl chloride;
(4) By absorption of latexes of the compositions B and C by polyvinyl chloride having a spongy structure.

The said preferred compositions constitute:

(A) Polymers of vinyl chloride having high molecular weight in amount equal to or higher than 80% by weight of the mix. Preferably the homopolymer is employed. However, the invention includes species in which for the polyvinyl chloride of the above specific examples there is substituted a high molecular weight copolymer of vinyl chloride with the monomers vinyl acetate, methyl acrylate, methylmethacrylate, acrylonitrile, vinylidene chloride, the vinyl chloride being preferably in prevailing proportion (98%) with respect to the other comonomers.

(B) Styrene-acrylonitrile copolymers containing 50-75% of styrene in amount not higher than 10% by weight of the mix. The styrene may be replaced by a styrene derivative such as methyl-styrene, chloro-styrene etc.

(C) A mixture—preferably in 1:2 ratio—of a butadiene/acrylonitrile copolymer containing from 50 to 75% of butadiene with a butadiene/acrylonitrile copolymer containing 75-90% butadiene.

The much preferred form of the invention is based on the use, as component "C," of a mixture of two butadiene/acrylonitrile copolymers having said different butadiene-to-acrylonitrile ratios. That mixture enables the obtaining of compositions having excellent machining qualities.

In the specification and claims, by polymers of vinyl chloride having high molecular weight, I intend to refer to polyvinyl chloride having a Fikentscher K-value higher than 45 and preferably of between 70 and 80.

Also I always refer herein to rigid polyvinyl chloride.

I claim:

1. An improved, high-impact strength thermoplastic composition comprising an intimate mixture of (1) at least 80% by weight of high molecular weight vinyl chloride homopolymer; (2) up to 10% by weight of a copolymer of styrene with acrylonitrile; and (3) up to 10% by weight of a first and second copolymer of 1,3 butadiene with acrylonitrile, said first butadiene-acrylonitrile copolymer containing from 50% to below 75% polymerized butadiene by weight, and said second butadiene-acrylonitrile copolymer containing from 75% to 95% polymerized butadiene by weight.

2. An improved, high-impact strength thermoplastic composition comprising an intimate mixture of (1) at least 80% by weight of high molecular weight vinyl chloride homopolymer; (2) up to 10% by weight of a copolymer of styrene with acrylonitrile; and (3) up to 10% by weight of a first and second copolymer of 1,3 butadiene with acrylonitrile, said first butadiene-acrylonitrile copolymer containing from 50% to below 75% polymerized butadiene by weight, and said second butadiene-acrylonitrile copolymer containing from 75% to 95% polymerized butadiene by weight, ingredient (2) constituting a copolymer of 50% to 75% by weight of styrene and 50% to 25% acrylonitrile.

3. A thermoplastic composition comprising an intimate mixture of (1) at least 80% by weight of a high molecular weight vinyl chloride polymer; (2) up to 10% by weight of a copolymer of 50% to 25% by weight acrylonitrile and 50% to 75% of a compound selected from the group consisting of styrene, methylstyrene and chlorostyrene; and (3) up to 10% by weight of a first and second 1,3 butadiene-acrylonitrile copolymer, said first copolymer containing 50% to below 75% polymerized butadiene by weight, and said second copolymer containing 75% to 95% polymerized butadiene by weight, the vinyl chloride polymer being taken from the group consisting of vinyl chloride homopolymer and copolymers of vinyl chloride with a member of the group consisting of vinyl acetate, methyl acrylate, methyl methacrylate, acrylonitrile, and vinylidene chloride, the vinyl chloride preponderating by weight.

4. The composition of claim 3, the vinyl chloride polymer being a copolymer in which the combined vinyl chloride is at least 98% of the copolymer.

5. An improved, high-impact strength thermoplastic composition comprising an intimate mixture of (1) at least 80% by weight of a high molecular weight vinyl chloride homopolymer; (2) 5% to 10% by weight of styrene-acrylonitrile copolymer; and (3) 5% to 10% by weight of a first and a second 1,3 butadiene-acrylonitrile copolymer, said first butadiene-acrylonitrile copolymer containing from 50% to below 75% polymerized butadiene by weight and said second butadiene-acrylonitrile copolymer containing from 75% to 95% polymerized butadiene by weight.

6. An improved, high-impact strength thermoplastic composition comprising an intimate mixture of (1) at least 80% by weight of a high molecular weight vinyl chloride homopolymer; (2) 5% to 10% by weight of a 50% to 75% by weight of styrene and 50% to 25% by weight acrylonitrile copolymer; and (3) 5% to 10% by weight of a first and second butadiene-acrylonitrile copolymer, said first butadiene-acrylonitrile copolymer being from 50% to below 75% polymerized butadiene by weight and said second copolymer being 75% to 95% polymerized butadiene by weight.

7. A thermoplastic composition comprising an intimate mixture of (1) at least 80% by weight of a high molecular weight vinyl chloride polymer; (2) 5% to 10% by weight of a copolymer consisting of 50% to 25% by weight of acrylonitrile with 50% to 75% by weight of a compound selected from the group consisting of styrene, methylstyrene, and chlorostyrene; and (3) 5% to 10% by weight of a first and second copolymer of 1,3 butadiene and acrylonitrile, said first butadiene-acrylonitrile copolymer consisting of 50% to 75% polymerized butadiene by weight and said second butadiene-acrylonitrile copolymer being 75% to 95% polymerized butadiene by weight, the vinyl chloride polymer being taken from the group consisting of vinyl chloride homopolymer and copolymers of vinyl chloride with a member selected from the group consisting of vinyl acetate, methyl acrylate, methyl methacrylate, acrylonitrile and vinylidene chloride, the vinyl chloride preponderating by weight.

8. The composition defined in claim 7, the vinyl chloride polymer being a copolymer constituting at least 90% by weight of vinyl chloride.

References Cited in the file of this patent
UNITED STATES PATENTS

| | | |
|---|---|---|
| 2,924,545 | Daly | Feb. 9, 1960 |
| 3,026,223 | Vanderbilt et al. | Mar. 20, 1962 |